UNITED STATES PATENT OFFICE.

ROBERT M. CHAPIN, OF WASHINGTON, DISTRICT OF COLUMBIA.

CONCENTRATED ANIMAL-DIP.

1,049,049.   Specification of Letters Patent.   Patented Dec. 31, 1912.

No Drawing.   Application filed August 14, 1912. Serial No. 715,018.

(DEDICATED TO THE PUBLIC.)

*To all whom it may concern:*

Be it known that ROBERT M. CHAPIN, a citizen of the United States, and an employee of the Department of Agriculture of the said United States, residing in the city of Washington, District of Columbia, whose post-office address is Washington, District of Columbia, prays that Letters Patent may be granted to him on a new and useful Concentrated Animal-Dip.

This application is made under the act of March 3, 1883, chapter 143 (22 Stat., 625), and the invention herein described and claimed may be used by the Government of the United States or any of its officers or employees in the prosecution of work for the United States or by any person in the United States without the payment of any royalty thereon.

The object of my invention is to provide a concentrated animal dip containing alkali arsenite, soap, pine tar, and other valuable ingredients, miscible with water, to form a uniform liquid insecticide appropriate and desirable for the dipping or spraying of cattle or other animals with a view of ridding them of Texas fever ticks, or other deleterious parasitic insects. It is well known that a solution containing alkali arsenite, soap, pine tar, and similar materials forms an effective and useful bath for destroying Texas fever ticks and other insects which infest cattle and other animals. Under ordinary conditions such a bath containing alkali arsenite, soap, and pine tar cannot be prepared in highly concentrated form, for the reason that ordinary soaps are nearly insoluble in strong alkali arsenite solution, being "salted out" in a manner well known to chemists. In experiments, I have discovered that this difficulty may be overcome by the addition of a proper quantity of commercial ethyl alcohol to a mixture of alkali arsenite, soap and pine tar.

My invention consists in the proper proportioning and blending of alcohol, water, alkali arsenite, soap, pine tar and other valuable ingredients so that a uniform and highly concentrated liquid shall result suitable for destroying Texas fever ticks and other insects that infest animals. In making my insecticide, I prepare a sufficient quantity of potash solution by dissolving an appropriate weight of high-grade commercial caustic potash in an equal weight of water, and then determine the exact strength of the solution by titration. I then prepare a practically neutral potash linseed oil soap by what is chemically known as the cold process by mixing the first-mentioned potash solution with linseed oil in calculated proportions approximating thirty (30) pounds potash solution to seventy (70) pounds linseed oil. Following this, I weigh a sample of the pine tar to be employed and dissolve the same in 95% alcohol, and then determine by titration the amount of acids contained therein, using alkali blue as an indicator. I also dissolve 100 pounds of powdered white arsenic containing not less than 99 per cent. arsenious oxid by stirring with a sufficient quantity of the hereinbefore-mentioned caustic potash solution to combine with all the arsenic to form $KAsO_2$ plus an amount sufficient to combine with the acids calculated to exist in 100 pounds of tar, the exact total amount necessary being approximately 125 pounds. To the solution of potassium arsenite I add 100 pounds of soap prepared in the manner hereinbefore described, together with 100 pounds of the pine tar, and then stir the whole until the soap is thoroughly disintegrated and blended with the tar. I then add approximately 12 gallons of commercial ethyl alcohol and sufficient water to make the whole volume about 55 gallons, and again stir the mixture until all the ingredients are completely dissolved. Upon the completion of this operation, I add more water in quantity sufficient to make the total volume 58 gallons, and again thoroughly stir the whole composition. The solution so prepared is a clear, dark-brown uniform liquid, readily miscible with water, and when mixed with water in the proportions of one gallon of the product to 85 gallons of water, yields a bath containing approximately 22/100 of one per cent. of arsenious oxid. The product when prepared in manner as herein disclosed will contain approximately 148 pounds of potassium arsenite, which amount of potassium arsenite is formed by chemical reaction in the process.

In preparing the product, caustic soda may be substituted in whole or in part for caustic potash. Other fatty materials, such as corn oil, cottonseed oil, fish oil, or commercial red oil or rosin may be substituted wholly or in part for linseed oil, while the alcohol employed may have been previously denatured in an appropriate manner. The materials may be blended in different order and in proportions different from those given without changing the essentials of my inventions.

Having thus described my invention, I claim:

1. A concentrated animal dip composition containing alkali arsenite, soap, pine tar, alcohol and water in such proportions as to form a uniformly blended mixture.

2. A concentrated animal dip composition containing potassium arsenite about 148 pounds, potash-linseed oil soap 100 pounds, neutralized pine tar 100 pounds, commercial ethyl alcohol 12 gallons, and sufficient water to make a total volume of 58 gallons.

In testimony whereof I affix my signature in the presence of two subscribed witnesses.

ROBERT M. CHAPIN.

Witnesses:
JOSEPH ABEL,
C. C. CARROLL.